United States Patent [19]

Koike et al.

[11] Patent Number: 4,919,388

[45] Date of Patent: Apr. 24, 1990

[54] PLASTICS SHAPING MOLD HAVING PATTERNED RESIN LAYER

[75] Inventors: Hiroyuki Koike, Nara; Yukihiro Hata, Osaka; Mitsushi Sogabe, Moriguchi, all of Japan

[73] Assignee: Tanazawa Hakko Sha Co., Ltd., Osaka, Japan

[21] Appl. No.: 247,236

[22] Filed: Sep. 21, 1988

Related U.S. Application Data

[63] Continuation of Ser. No. 943,107, Dec. 17, 1986, abandoned.

[30] Foreign Application Priority Data

| Dec. 20, 1985 | [JP] | Japan | 60-288369 |
| Dec. 20, 1985 | [JP] | Japan | 60-288368 |
| Jan. 31, 1986 | [JP] | Japan | 61-21074 |

[51] Int. Cl.$^5$ ................................ B29C 33/56
[52] U.S. Cl. ................ 249/115; 249/114.1; 249/134; 249/135; 264/338; 425/DIG. 30; 427/135
[58] Field of Search ............ 249/112, 114.1, 115, 249/116, 134, 135; 264/1.2, 106, 107, 338, 225, 227; 425/810, DIG. 30; 427/133, 135

[56] References Cited

U.S. PATENT DOCUMENTS

| 2,903,761 | 9/1959 | Sirmay | 249/114 |
| 3,286,312 | 11/1966 | Davis et al. | 249/114.1 |
| 3,684,004 | 8/1972 | Germain et al. | 249/114.1 |
| 3,728,098 | 4/1973 | Giffen | 249/114 |
| 3,761,047 | 9/1973 | Mao | 249/115 |
| 3,937,774 | 2/1976 | Wiley et al. | 264/337 |
| 4,085,792 | 4/1978 | Eberle | 249/114 |
| 4,202,523 | 5/1980 | Radtke | 249/115 |
| 4,225,109 | 9/1980 | Yotsutsuji et al. | 249/114.1 |
| 4,343,345 | 8/1982 | Brugger | 427/135 |
| 4,482,511 | 11/1984 | Komatsubara | 264/2.5 |
| 4,509,358 | 4/1985 | Krowl | 249/134 |
| 4,592,887 | 6/1986 | Bando et al. | 249/115 |

FOREIGN PATENT DOCUMENTS

| 50-34058 | 4/1975 | Japan . | |
| 53-67712 | 6/1978 | Japan | 249/135 |
| 58-104190 | 6/1983 | Japan | 427/135 |
| 59-232836 | 12/1984 | Japan | 249/135 |
| 1238019 | 7/1971 | United Kingdom | 249/114 |

*Primary Examiner*—James C. Housel
*Attorney, Agent, or Firm*—Edwin E. Greigg

[57] ABSTRACT

A plastics shaping mold comprising a layer of hardened resin material fixedly superposed on a metal mold and defining an uneven shaping surface for forming an uneven surface pattern on plastic articles. The plastics shaping mold is prepared by a method comprising the steps of superposing a resin material in a fluid state on a master in sheet form defining an uneven surface inverse to the uneven shaping surface to be formed, allowing the resin material to harden and removing the master, thereby to form the layer of hardened resin material defining the uneven shaping surface.

11 Claims, 6 Drawing Sheets

PLASTICS SHAPING MOLD HAVING PATTERNED RESIN LAYER

This application is a continuation of application Ser. No. 943,107 filed 12/17/86, abandoned.

BACKGROUND OF THE INVENTION (1) Field of the Invention

The present invention relates to a plastics shaping mold and a method of preparing the mold, which mold is used for manufacturing plastic articles having various patterns defined by unevenness of its surface such as a wood grain pattern, an aventurine pattern and a marbled pattern. More particularly, the invention relates to a plastics shaping mold and a method of preparing the mold, which mold defines an uneven shaping surface for forming an uneven surface pattern, that is to say for manufacturing plastic articles with an uneven surface pattern.

(2) Description of the Prior Art

It has been conventional practice to etch the uneven shaping surface on a metal mold as shown in FIG. 15 of the accompanying drawings.

According to such a method, projections on the shaping surface are all of an equal height since the unevenness of the metal mold surface is formed by etching. As a result, recesses of the pattern formed on the plastic articles are all of the same depth, which fails to provide the articles with a sufficient touch of rich quality.

On the other hand, a plastics shaping mold has been proposed which has an uneven shaping surface reinforced by applying to the metal mold surface a resin layer formed of a resin impregnated with glass fiber (see the Japanese patent application laid open under No 50-34058). However, in the case of this plastics shaping mold, if it is attempted to reduce the thickness of the resin layer (to less than 0.5 mm) in order to avoid the deformation and quality deterioration due to heating by improving the heat conductivity between the resin and the mold (generally of metal) in the course of forming the plastics, since the glass fiber contained in this resin layer has a substantially long chop strand length, on the order of 2-3 mm, there tends to occur disadvantageous directional concentration of the glass fibers in this thin resin layer; that is, most of the glass fibers tend to be aligned horizontally along the shaping surface.

This horizontal concentration in the alignment of the glass fibers results in vulnerability of the resin layer against the heat or external physical forces. Moreover, the above-described relatively long length (2-3 mm) of the glass fiber also caused difficulty in accurately forming a very fine concave-convex pattern in the resin.

Furthermore, a mold for injection molding has been developed as the plastics shaping mold having uneven surfaces, which utilizes an epoxy resin (trade name: ARARUDITE which is an epoxy resin adhesive agent). This plastics shaping mold comprises an upper and a lower jaws formed of cast aluminum and each carrying an ARARUDITE layer having a fixed thickness (2-3 mm) coated over an entire surface thereof. Plastic articles are obtained by injecting resin into a space between the upper and lower jaws.

With this plastics shaping mold, however, the resin covering the shaping surfaces has only insufficient strength and has a short life of use since the resin covers the entire surfaces. After all, this mold serves just as a simplified version of mold not capable of withstanding an increased production.

SUMMARY OF THE INVENTION

A first object of the present invention is to provide a strong and durable plastics shaping mold capable of producing plastic articles having a touch of rich quality.

A second object of the present invention is to provide a method of preparing or manufacturing, with ease and good yield, a plastics shaping mold capable of producing plastic articles having a touch of rich quality.

In order to achieve the first object, a plastics shaping mold according to the invention comprises a metal mold, and a layer of hardened material fixedly superposed on the metal mold and defining an uneven shaping surface for impressing an uneven surface pattern.

With the above plastics shaping mold, the layer of hardened material fixedly superposed on the metal mold has an uneven shaping surface for impressing an uneven surface pattern, reliably and correctly transplanted from a master defining an uneven shaping surface inverse thereto, which is achieved by superposing a hardenable material in a fluid state on the uneven shaping surface of the master. Therefore, the projections and recesses in the uneven shaping surface may be set to any desired heights and depths. The plastics shaping mold having these features according to the invention is capable of producing plastic articles having a pattern full of level variations and a touch of rich quality.

In order to achieve the second object, a method of preparing a plastics shaping mold according to the present invention comprises the steps of superposing a hardenable material in a fluid state on an uneven surface of a master in sheet form, the uneven surface being inverse to an uneven shaping surface to be formed, allowing the hardenable material to harden, and thereafter removing the master thereby forming a layer of hardened material having the uneven shaping surface.

In the above method, the master defining an uneven surface for impression on the hardenable material is superposed on the hardened material in a fluid state as placed on the metal mold, or the master carrying the hardenable material in a fluid state is superposed on the metal mold. At this time, the master whether carrying the hardenable material or not is gradually superposed from one end thereof to expel air from between the master and the hardenable material and from inside the hardenable material. The resulting layer of hardenable material contains no bubbles or voids and is impressed with an uneven shaping surface reliably and correctly. Moreover, the master may gradually be separated from the layer from one end. Such a separating process does not result in an undue force applied to the layer that would damage the projections and recesses therein. Thus, the method according to the present invention is effective for preparing the shaping mold capable of producing plastic articles having a touch of rich quality, economically, efficiently and with a good yield involving few rejects.

Other objects and advantages of the present invention will be apparent from the following description.

DESCRIPTION OF THE PREFERRED EMBODIMENTS

Figure 1:
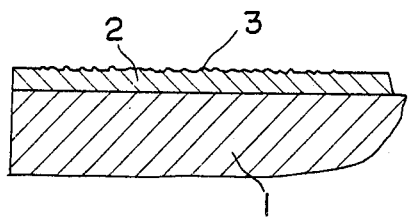
FIG. 1 is a sectional view of a plastics shaping mold according to the present invention.

A plastics shaping mold according to the invention is intended for production of plastic articles having a pattern defined by unevenness of its surface. As shown in FIG. 1, the plastics shaping mold comprises a metal mold 1 fixedly superposed by a layer of ceramic or other hardened material 2 such as of $SiO_2$, defining an uneven surface 3 for impressing the pattern. The layer of hardened material 2 is provided only on a position or positions of the metal mold 1 corresponding to a position or positions of the plastic article where the pattern should be impressed. In other words, the layer 2 is not provided on parting surfaces of an upper jaw and a lower jaw of the mold which contact each other under a continuous pressure, or other unnecessary positions (the positions not used for impressing the pattern). Therefore, the layer of hardened material 2 now has a greatly prolonged life.

Figure 2:
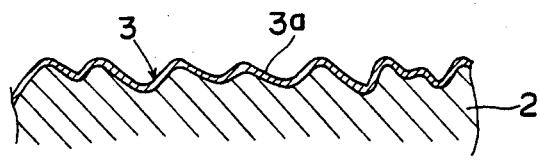
FIG. 2 is an enlarged sectional view of the mold shown in FIG. 1, FIGS. 3(a) through 13(b) are views showing various stages of preparation of the mold, respectively.

Instead of the ceramic layer, the layer of hardened material 2 may comprise a layer of a suitable resin mixed with ceramic whisker, to have an increased strength. More particularly, the layer of hardened material 2 may comprise an epoxy resin mixed with ceramic whisker such as the whisker of $SiO_2$ or $Al_2O_3$ having a diameter of 0.05–17 m, desirably about 0.5 m, and a length of 10–300 m, desirably about 50 m. In this case the whisker is mixed by weight in 1–100 parts to the epoxy resin in 20 parts. However, the amount of whisker is suitably selected in accordance with the amount of filler mixed into the resin. Generally, the epoxy resin should desirably comprise a composition consisting of a novolak type resin and a carboxyimide anhydride complex. The layer 2 may be mixed with the whisker of Al, Fe, Cu or other metals instead of the ceramic whisker, or with a combination of metal and ceramic whiskers. Furthermore, the layer 2 may comprise a resin mixed with metal particles instead of or together with the above-noted whisker or whiskers. As shown in FIG. 2(e) which is an enlarged view of the layer of hardenable material 2, the uneven surface 3 of layer 2 may be provided with a removing layer 3a composed mainly of tetrafluoroethylene (trade name: TEFLON), to facilitate removal of the plastic article, as shown in FIG. 3.

The layer of hardened material 2 normally has a thickness not exceeding 0.6 mm although its thickness is selected according to the pattern to be impressed upon the plastic article. Where the layer of hardened material 2 has a thickness exceeding 0.6 mm, it would take time to release the heat generated during a molding operation, which would extend the molding cycle time to the detriment of productivity.

The layer of hardened material 2 having a thickness not exceeding 0.6 mm is not only free from such a drawback, but permits the pattern to remain firm against the pressure applied thereto during the molding operation and has excellent shrinkage adaptability with respect to the metal mold. The layer of hardened material 2 should desirably have a thickness 0.2–0.6 mm. The thickness below 0.2 mm is not suitable in that a certain depth is required for forming the pattern and the layer of such a small thickness would include weak portions.

Methods of preparing the shaping mold will be described process by process hereinafter.

Preparation Method 1

Figure 3A:
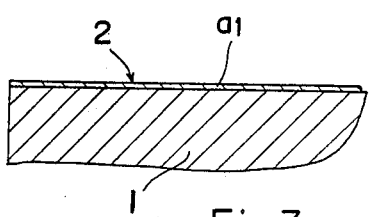
Figure 3B:
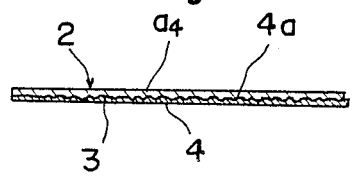

Referring to FIG. 3(a), the surface of metal mold 1 on which the ceramic layer 2 is to be placed is treated with blast or the like to become an uneven surface to facilitate adhesion thereto of the ceramic layer 2. Then the ceramic material (such as $SiO_2$) in a fluid state is applied in film form to the treated metal mold surface, thereby to form a first ceramic layer $a_1$. On the other hand, as shown in FIG. 3(b), the ceramic material (such as $SiO_2$ or $Al_2O_3$) in a fluid state is applied in film form to an uneven surface 4a of a master 4 which is in the form of a flexible sheet, thereby to form a fourth ceramic layer $a_4$, the uneven surface 4a being inverse to the uneven shaping surface 3 to be formed.

Figure 3C:
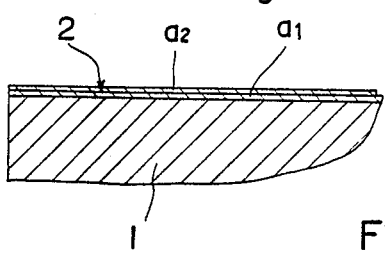
Figure 3D:
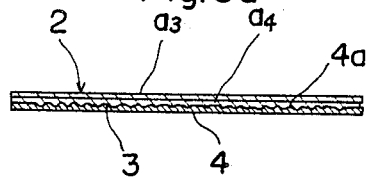

As shown in FIG. 3(c), the ceramic material (such as $SiO_2$) in a fluid state is applied in film form to the first ceramic layer $a_1$ to form a second ceramic layer $a_2$, and similarly, as shown in FIG. 3(d), the ceramic material (such as $SiO_2$) in a fluid state is applied in film form to the fourth ceramic layer $a_4$ to form a third ceramic layer $a_3$.

Figure 3E:
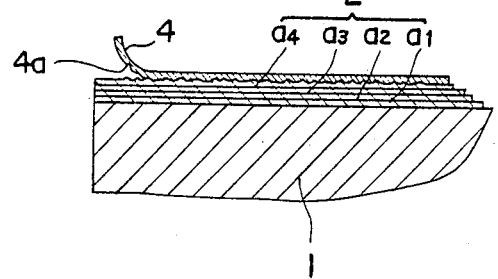

Referring to FIG. 3(e), before the ceramic layers $a_1$ to $a_4$ become hard, the master 4 bearing the third and fourth ceramic layers $a_3$ and $a_4$ is gradually superposed from one end to bring the second and third layers $a_2$ and $a_4$ into mutual contact. When the fourth ceramic layer $a_4$ has hardened to an incollapsible degree, the master 4 is gradually peeled off and the ceramic material is allowed to harden. As a result, the ceramic layer 2 formed by the four layer construction defining the uneven shaping surface 3 is secured to the metal mold 1.

The layer of hardened material may comprise a resin layer instead of the ceramic layer. The resin layer may contain aggregates such as ceramic whisker, metal whisker or metal particles, or a combination of these materials, to improve its strength.

The material for flexible master 4 may be selected from rubbers such as silicone rubber and styrene butadiene rubber (SBR), elastomers such as styrene elastomer, and vinyl chloride resin.

Other methods of preparation of the plastic shaping mold will be described hereinafter.

Preparation Method 2

Figure 4A:
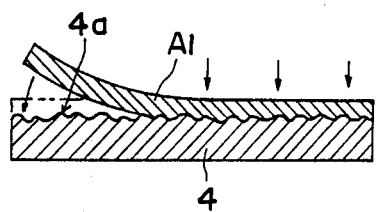
Figure 4B:
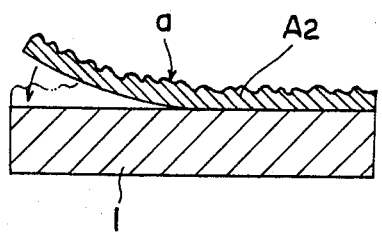

Referring to FIG. 4(a) and FIG. 4(b), a half-hardened resin sheet A1 is formed of an epoxy resin mixed with a whisker. Thereafter, while this resin sheet A1 remains in the half-hardened state, (1) the resin sheet A1 is pressed against a master 4 defining an uneven surface pattern to be formed on the plastic article, thereby making a patterned resin sheet A2 which forms the resin layer and defines an uneven patterned face a on one surface thereof constituting the uneven shaping surface 3, and (2) subsequently, separating the patterned resin sheet A2 from the master 4, applying the sheet A2 to the metal mold 3, and heating the entire sheet A2 in that state to harden the sheet A2, whereby the resin layer 2 having the uneven shaping surface 3 is formed.

Since the resin layer 2 comprising a hardenable material has flexibility before hardening, the master 4 may comprise a hard material (such as wood) having rigidity instead of flexibility.

The foregoing method of preparation of the resin sheet A1 may comprise the slip blade method, the doctor blade method, a roll method in which a roll is employed in place of the doctor blade in the doctor blade method, the calender method, paper dipping method, continuous pressurizing method, injection molding method, a slicing method in which a block of resin is sliced, the squeegee method, an extension method in which the resin in half-hardened state is extended, a shaving method in which a block of resin is shaved, the press shaping method, a centrifugal method in which the resin is extended by a centrifugal force, an extrusion method in which the resin is extruded in sheet form from an extruder, and a spray method in which the resin is sprayed in a certain thickness to the mold surface.

Figure 5:
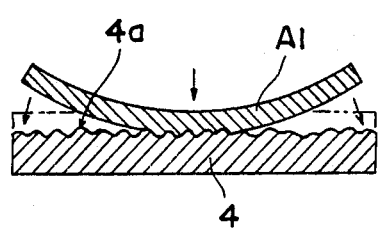
Figure 6:
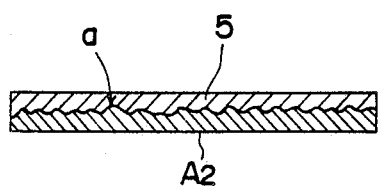

In the step (1) above, the resin sheet A1 is gradually pressed to the uneven patterned surface 4a from one end thereof by utilizing the flexibility of resin sheet A1 as shown in FIG. 4(a). Alternatively, the resin sheet A1 is gradually pressed to the uneven patterned surface 4a from its center as shown in FIG. 5. This ensures good superposition of the resin sheet A1 on the master 4 without air entering between the resin sheet A1 and uneven patterned surface 4a. The patterned resin sheet A2 is applied to the metal mold 1 in a similar manner. Further, in the step (2) above, where the master 4 is formed of a hard material, the patterned resin sheet A2 is removed from the master 4 by flexing the patterned resin sheet A2, and where the master 4 is formed of a soft material, namely a flexible material, the patterned resin sheet A2 is removed from the master 4 by flexing the master 4 or patterned resin sheet A2 or both. In addition, in the step (2), as shown in FIG. 6, before the patterned resin sheet A2 is applied to the metal mold 1 the uneven patterned surface a of patterned resin sheet A2 may be coated with a protective layer 5 comprising wax or the like which melts, burns or evaporates by the heat used for hardening the patterned resin sheet A2. This provision is effective to prevent collapse of the uneven patterned surface a of patterned resin sheet A2 when applied to the metal mold 1 and to reinforce the patterned resin sheet A2 with the protective layer 5 thereby to facilitate handling of the patterned resin sheet A2.

Preparation Method 3

Figure 7:
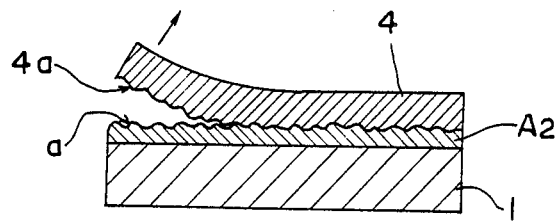

As shown in FIG. 7, instead of the step (2) in Preparation Method 2, the master 4 is removed from the patterned resin sheet A2 after the patterned resin sheet A2 is applied to the metal mold 1.

Preparation Method 4

Figure 8A:
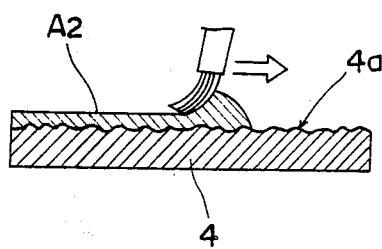
Figure 8B:
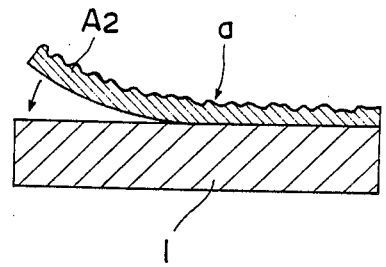

As shown in FIG. 8(a) and FIG. 8(b), the patterned resin sheet A2 having the uneven patterned surface a is prepared by applying, pressing or pouring the whisker-containing epoxy resin to the uneven patterned surface 4a of master 4. Before the patterned resin sheet A2 becomes hard, the patterned resin sheet A2 is removed from the master 4 and is applied to the metal mold 1. Then the patterned resin sheet A2 is heated to become hard. The patterned resin sheet A2 is removed from the master 4 and applied to the metal mold 1 as in Preparation Method 2 above.

Preparation Method 5

Figure 9A:
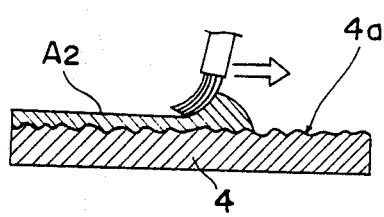
Figure 9B:
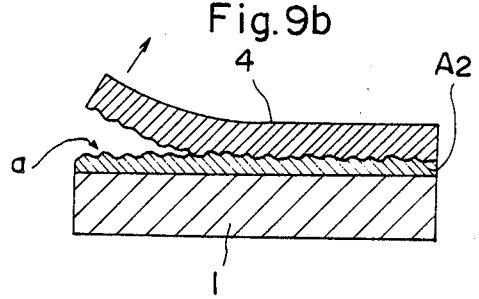

As shown in FIG. 9(a) and FIG. 9(b), the patterned resin sheet A2 prepared as in Preparation Method 4 above is applied together with the master 4 to the metal mold 1. Then the master 4 is removed, and the patterned resin sheet A2 is heated to become hard.

Preparation Method 6

Figure 10A:
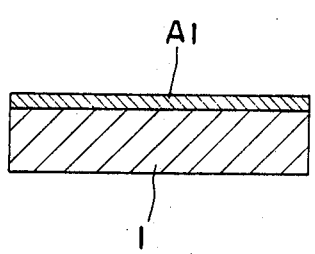
Figure 10B:
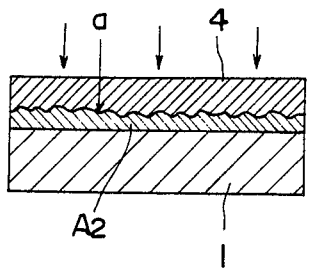
Figure 10C:
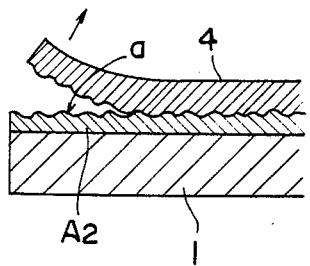

As shown in FIG. 10(a), FIG. 10(b) and FIG. 10(c), the patterned resin sheet A2 is prepared by applying the resin sheet A1 in the half-hardened state to the metal mold 1 and pressing the master 4 upon the resin sheet A1. After the master 4 is removed, the patterned resin sheet A2 is heated to become hard.

Preparation Method 7

Figure 11A:
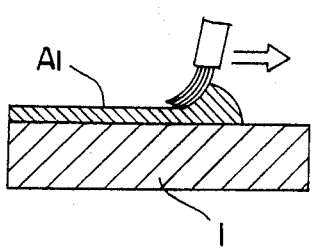
Figure 11B:
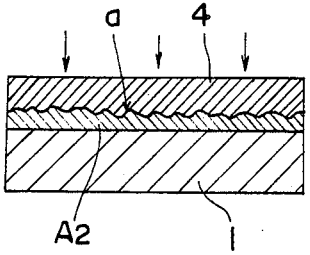
Figure 11C:
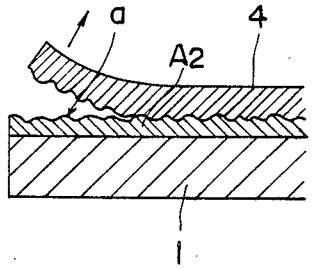

As shown in FIG. 11(a), FIG. 11(b) and FIG. 11(c), the patterned resin sheet A2 adhering to the metal mold 1 is prepared by applying the whisker-containing epoxy resin in a fluid state to the metal mold 1 and, when the resin is half hardened, pressing the master 4 upon the resin sheet A1. After the master 4 is removed, the patterned resin sheet A2 is heated to become hard.

Preparation Method 8

Figure 12A:
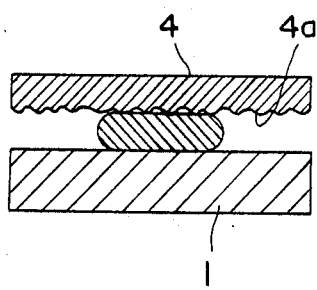
Figure 12B:
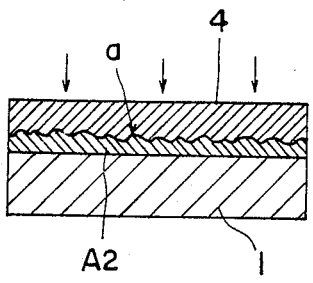
Figure 12C:
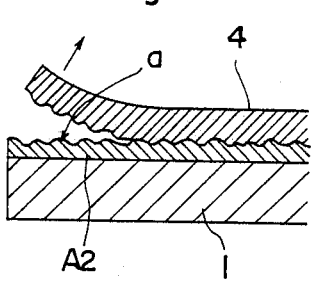

As shown in FIG. 12(a), FIG. 12(b) and FIG. 12(c), the patterned resin sheet A2 adhering to the metal mold 1 is prepared by placing the whisker-containing epoxy resin in a half-hardened (clay-like) state on the metal mold 1 and pressing the master 4 upon the resin sheet A1. After the master 4 is removed, the patterned resin sheet A2 is heated to become hard.

Preparation Method 9

Figure 13A:
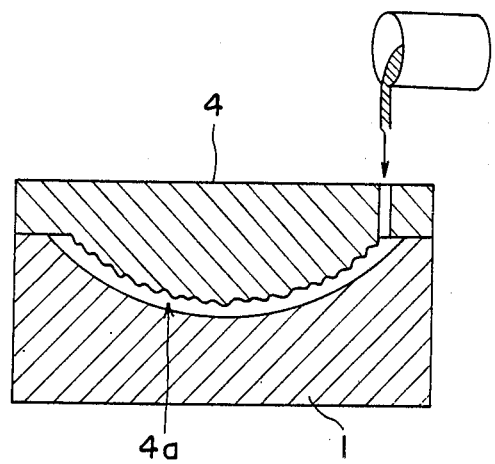
Figure 13B:
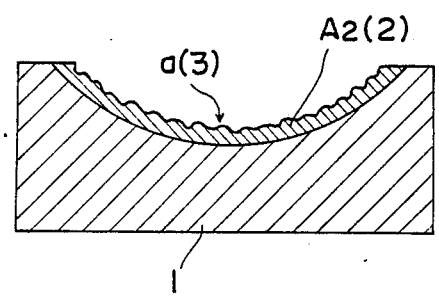

As shown in FIG. 13(a) and FIG. 13(b), the patterned resin sheet A2 adhering to the metal mold 1 is prepared by pouring the whisker-containing epoxy resin in a fluid state into a space between the metal mold 1 and master 4. After the patterned resin sheet A2 is half-hardened, the master 4 is removed and the patterned resin sheet A2 is heated to become hard.

In each of the foregoing preparation methods, the removing layer 3a is formed by applying a removing agent to the uneven patterned surface a of patterned resin sheet A2 prior to the heating step, the applied removing agent becoming hard through heating.

In addition to the resins already noted, the material for resin layer 2 may be selected from an ordinary epoxy resin, acrylic resin, polyacetal resin, polyamide resin, polyimide resin, polyurethane resin, polyester resin, polyethylene resin, polycarbonate resin, polypropylene resin, silicone resin, fluoride resin, melamine resin, urea resin, phenol resin, phthalate resin, styrol resin, cellulose resin, vinyl chloride resin, and vinyl acetate resin. These resins may be employed on their own or in combination.

In each of the foregoing preparation methods, the resin sheet A1 and patterned resin sheet A2 may be applied to the metal mold 1 by relying solely on the adhesive nature of the resin per se or by utilizing an adhesive agent. The surface of metal mold 1 to which the resin sheets A1 and A2 are applied should be pretreated with blast or the like to form a coarse surface for facility of adhesion.

The present invention embraces various modifications as follows:

The whiskers to be mixed include those of aluminum, iron, copper and other metals.

The whiskers to be mixed may comprise a combination of ceramic whisker and metal whisker.

The resin layer 2 may comprise a resin mixed with ceramic and/or metal particles in addition to the whisker.

The protective layer 5 may be formed of an easily peelable material soluble to water or other liquid.

In the Preparation Methods 3, 5, 6, 7, 8 and 9, the master 4 may be removed after the patterned resin sheet A2 becomes hard.

Of course the removing layer 3a need not be provided on the uneven shaping surface 3 where the resin layer 2 per se has a removal function.

A master removing method will be described next, which method permits the shaping surface 3 to be formed with increased precision without breaks or cracks occurring to the shaping surface 3 due to unnecessary external forces applied to the shaping surface 3 when the master 4 is removed from the shaping surface 3. This method is characterized by the removal of the master 4 from the shaping surface 3 by chemically changing the master 4 into a fluid state. Therefore, the master 4 and the hardenable layer 2 may both be formed of a rigid material. Means for chemically changing the master 4 into a fluid state are listed hereinafter.

(1) The master 4 is dissolved into liquid state by means of a liquid or gas. The liquid or gas may either be hydrophilic or lipophilic, and may be acidic, alkaline or neutral. In other words, the liquid or gas used is capable of dissolving only the master 4 without dissolving the resin layer 2. Examples of combination of the master 4 and the solvent liquid are as follows: a combination where the master 4 is formed of an ultraviolet hardenable alkali-soluble resin and the liquid is an aqueous solution of sodium carbonate, a combination where the master 4 is formed of an ultraviolet hardenable acrylic ester resin and the liquid is an aqueous solution of sodium hydroxide, a combination where the master 4 is formed of a water-soluble resin having polyvinyl alcohol as the main component and the liquid is a mixture of alcohol and water, a combination where the master 4 is formed of a mixture of fibrous carboxy methyl cellulose and wood pulp and the liquid is water, and a combination where the master 4 is formed of a water-soluble resin (for example, the resin tradenamed ISOBAN) and the liquid is water.

(2) The master 4 is jellied to become fluid by means of a liquid or gas. As in the foregoing case of dissolving the master, the liquid or gas acts on the master 4 only.

(3) The master 4 is melted into liquid state through heating. Here the master 4 may be formed of ice or wax, for example.

(4) The master 4 is sublimated into a gas through a natural process or through heating. The master 4 may be formed of solid alcohol or naphthalene, for example.

(5) The master 4 is changed into a gas through reaction with a gas. The latter of course is active on the master 4 only.

(6) The master 4 is burned into a gas. The master 4 is formed of a combustible material such as paper, wood, wax or solid alcohol.

(7) The master 4 is decomposed by heat, light or bacteria to become particles, fine grains or powder which is one form of fluid state. A photo-decomposable material for the master 4 may for example be a product called photo-decomposable tape.

The master 4 may be removed after the resin layer 2 has completely hardened, but may also be removed when the resin layer 2 has hardened to a noncollapsible degree, namely while the resin layer is still soft.

The resin layer 2 may be formed of synthetic resin only, but may also be formed of a resin mixed with one or a plurality of fibers (such as glass fiber, carbon fiber and metal fiber), the various types of whisker, and particles acting as organic or inorganic aggregates.

Figure 14:
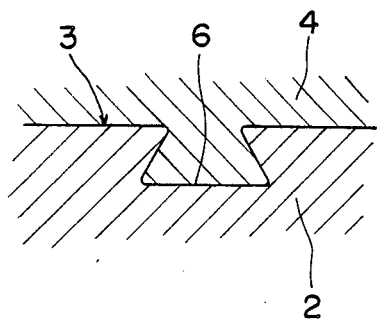
FIG. 14 is an enlarged sectional partial view of the mold showing how a master for the mold is removed.
Figure 15:
FIG. 15 is a sectional view of a prior art plastics shaping mold.

The shaping surface 3 is of course free from a stress when removing the master 4 by the described means to change the master 4 into a fluid state. The master 4 can positively be removed even where, for example, the pattern to be impressed includes a recess 6 having an enlarged bottom as shown in FIG. 14. Particularly where the master 4 is removed after heating it into a fluid state, the resin may be cured by the heat at the same time.

The fluid state according to the present invention should be understood to include an ashy state resulting from combustion, a brittle state produced chemically in which the master 4 may easily break into particles, and other states where the master 4 may easily be fluidized into particles or the like by applying a force short of deforming or otherwise damaging the formed shaping surface 3.

Other methods of removing the master 4 will be described next.

In changing the master 4 into the fluid state for removal, the master 4 may first be mechanically cut to be thinner and then changed into the fluid state. This may shorten the time required for the removal even if the fluidization rate of the master 4 per se is slow.

Generally, the master 4 becomes fluid progressively from its back surface (namely, the surface out of contact with the shaping surface 3). In this situation portions of the master 4 that have become fluid may suitably be removed by mechanical means as the fluidization progresses from the back surface in the case that the fluid portions remain on the surfaces of near-fluid but not fully fluidized portion. By mechanically removing the fluidized portions of the master 4, the portions not fluidized yet become exposed to effective action of the liquid, gas or heat used for fluidizing the master 4, and as a result the master 4 may be removed with high efficiency.

What is claimed is:

1. A mold for shaping a plastic material, which comprises a first mold portion and a second mold portion, a hardened resin layer of non-uniform thickness fixedly superposed on at least a pattern-defining portion of said first mold portion and adapted to be in contact with said plastic material, said hardened resin layer on said first mold portion having a pattern defining shaping surface of non-uniform thickness, said pattern defining shaping surface of non-uniform thickness being exposed toward said second mold portion for impressing a pattern defined surface of non-uniform thickness on said plastic material injected between said exposed pattern-defining shaping surface of non-uniform thickness and said second mold portion, said hardened resin layer has a thickness of from about 0.2 mm to about 0.6 mm with said pattern defining surface of non-uniform thickness to be impressed on said plastic material being shallower than said resin layer thickness.

2. A mold for shaping a plastic material as claimed in claim 1 wherein said hardened resin layer (2) comprises a ceramic material dispersed therein.

3. A mold for shaping a plastic material as claimed in claim 1 wherein said hardened resin layer (2) comprises at least one material selected from a group consisting of a ceramic whisker, a metal whisker, or metal particles mixed with a resin.

4. A mold for shaping a plastic material as claimed in claim 3 wherein said hardened resin layer contains 1-100 parts of metal whisker by weight mixed with 20 parts of resin by weight.

5. A mold for shaping a plastic material as claimed in claim 3, wherein said selected material is a ceramic whisker.

6. A mold for shaping a plastic material as claimed in claim 5, wherein said ceramic whisker has a diameter of 0.05 to 17 micrometers and a length of from 10-300 micrometers.

7. A mold for shaping a plastic material as claimed in claim 1 wherein said pattern defining shaping surface of non-uniform thickness (3) includes a removing layer (3a).

8. A mold for shaping a plastic material as claimed in claim 7 wherein said hardened resin layer (2) comprises at least one material selected from a group consisting of a ceramic whisker, a metal whisker, or metal particles mixed with a resin.

9. A mold for shaping a plastic material as claimed in claim 7, wherein said removing layer (3a) is tetrafluoroethylene.

10. A mold for shaping a plastic material as claimed in claim 1, wherein said hardened resin layer (2) comprises a ceramic mixed with a resin.

11. A mold for shaping a plastic material as claimed in claim 10, wherein said hardened resin layer also includes metal particles mixed with said resin.

* * * * *